(12) United States Patent
Velten et al.

(10) Patent No.: US 11,261,894 B2
(45) Date of Patent: Mar. 1, 2022

(54) ANCHOR HAVING A WAVE-SHAPED SLEEVE

(71) Applicant: Hilti Aktiengesellschaft, Schaan (LI)

(72) Inventors: Simon Velten, Nenzing (AT); Marc Schaeffer, Altendorf (CH)

(73) Assignee: Hilti Aktiengesellschaft, Schaan (LI)

( * ) Notice: Subject to any disclaimer, the term of this patent is extended or adjusted under 35 U.S.C. 154(b) by 94 days.

(21) Appl. No.: 16/096,366

(22) PCT Filed: Apr. 25, 2017

(86) PCT No.: PCT/EP2017/059722
§ 371 (c)(1),
(2) Date: Oct. 25, 2018

(87) PCT Pub. No.: WO2017/186674
PCT Pub. Date: Nov. 2, 2017

(65) Prior Publication Data
US 2019/0136892 A1 May 9, 2019

(30) Foreign Application Priority Data
Apr. 27, 2016 (EP) .................................... 16167176

(51) Int. Cl.
*F16B 13/06* (2006.01)
*F16B 35/04* (2006.01)
(52) U.S. Cl.
CPC .......... *F16B 13/065* (2013.01); *F16B 35/048* (2013.01)

(58) Field of Classification Search
CPC .... F16B 13/065; F16B 13/063; F16B 13/066; F16B 13/068; F16B 13/06; F16B 13/0858; F16B 35/048
(Continued)

(56) References Cited

U.S. PATENT DOCUMENTS 525,222 A * 8/1894 Levering ................. F16B 13/00
411/51
937,039 A * 10/1909 Bauer ................... F16B 13/065
411/55
(Continued)

FOREIGN PATENT DOCUMENTS

| CN | 2196203 | 5/1995 |
| CN | 2287681 | 8/1998 |

(Continued)

OTHER PUBLICATIONS

International Search Report of PCT/EP2017/059722, dated Jul. 6, 2017.

*Primary Examiner* — Flemming Saether
*Assistant Examiner* — Amit Singh Dhillon
(74) *Attorney, Agent, or Firm* — Davidson, Davidson & Kappel, LLC

(57) ABSTRACT

An anchor having a sleeve, a bolt which passes through the sleeve and at least one expansion element that is positioned in front of the sleeve and that is axially supported on the sleeve, whereby the bolt has an expansion area for the expansion element, is provided. According to the invention, it is provided for the sleeve to have a wavy shape with axial wave peaks in which the outer radius of the sleeve as well as the inner radius of the sleeve each have a maximum, and with wave valleys in which the outer radius of the sleeve as well as the inner radius of the sleeve each have a minimum.

22 Claims, 3 Drawing Sheets

(58) Field of Classification Search
USPC ............... 411/57.1, 60.1, 55, 69, 49–53
See application file for complete search history.

(56) References Cited

U.S. PATENT DOCUMENTS

| | | | | |
|---|---|---|---|---|
| 1,121,980 | A * | 12/1914 | Conrad | F16B 13/066 411/53 |
| 1,410,258 | A * | 3/1922 | Kennedy | F16B 13/122 411/61 |
| 1,499,071 | A * | 6/1924 | Pleister | F16B 13/124 411/80.5 |
| 1,802,270 | A * | 4/1931 | Rawlings | F16B 13/025 411/61 |
| 2,931,412 | A * | 4/1960 | Wing | F16D 1/0835 411/108 |
| 3,425,311 | A * | 2/1969 | Levy | F16B 19/00 411/479 |
| 3,626,803 | A * | 12/1971 | Liebig | F16B 13/068 411/42 |
| 3,667,341 | A | 6/1972 | Kaplan et al. | |
| 4,284,379 | A * | 8/1981 | Chaiko | E21D 21/004 405/259.3 |
| 4,484,848 | A | 11/1984 | Otto et al. | |
| 4,753,559 | A | 6/1988 | Pentesco | |
| 4,971,494 | A | 11/1990 | Gauthier et al. | |
| 5,065,490 | A | 11/1991 | Wivagg et al. | |
| 5,085,544 | A * | 2/1992 | Gerhard | F16B 13/0891 411/33 |
| 5,232,322 | A | 8/1993 | Regensburger et al. | |
| 5,395,194 | A * | 3/1995 | Johnson | F16B 5/025 29/525.11 |
| 5,941,668 | A * | 8/1999 | Kaibach | F16B 13/065 411/30 |
| 6,059,503 | A * | 5/2000 | Johnson | F16B 41/002 411/353 |
| 6,309,155 | B1 * | 10/2001 | Huang | F16B 13/0858 411/55 |
| 7,210,885 | B2 | 5/2007 | Pinzl | |
| 8,714,896 | B2 | 5/2014 | Bohnet et al. | |
| 9,644,669 | B2 * | 5/2017 | Griffiths | F16B 13/04 |
| 9,765,804 | B2 | 9/2017 | Schaeffer | |
| 10,550,876 | B2 * | 2/2020 | Slater | F16B 41/002 |
| 2005/0117997 | A1 * | 6/2005 | Pinzl | F16B 37/005 411/367 |
| 2007/0253793 | A1 | 11/2007 | Moore et al. | |
| 2012/0230796 | A1 | 9/2012 | McClure et al. | |
| 2012/0237313 | A1 * | 9/2012 | Bohnet | F16B 13/065 411/15 |
| 2013/0081257 | A1 | 4/2013 | McClure et al. | |
| 2013/0202364 | A1 * | 8/2013 | Ikuno | F16B 13/066 405/259.3 |
| 2014/0050550 | A1 * | 2/2014 | Stempniewski | F16B 13/141 411/360 |
| 2017/0082130 | A1 | 3/2017 | Stempniewski et al. | |
| 2017/0343026 | A1 | 11/2017 | Schaeffer | |

FOREIGN PATENT DOCUMENTS

| | | |
|---|---|---|
| CN | 1198514 | 11/1998 |
| CN | 2300754 | 12/1998 |
| CN | 2495839 Y | 6/2002 |
| CN | 201162748 Y | 12/2008 |
| CN | 202082228 U | 12/2011 |
| CN | 102439321 A | 5/2012 |
| CN | 203906476 | 10/2014 |
| CN | 104454865 A | 3/2015 |
| CN | 204343616 | 5/2015 |
| DE | 3336168 C2 | 4/1985 |
| DE | 8416683 U1 | 1/1988 |
| DE | 19538898 C2 | 4/1997 |
| DE | 10 2004 010727 A | 9/2005 |
| DE | 202004007649 U1 | 9/2005 |
| DE | 10 2006 053226 A | 5/2008 |
| DE | 10 2007 060956 A1 | 6/2009 |
| DE | 20 2009 013641 U1 | 3/2011 |
| EP | 0627567 A1 | 12/1994 |
| EP | 2848825 A1 | 3/2015 |
| JP | H6193151 B2 | 7/1994 |
| JP | H07144269 A | 6/1995 |
| JP | 2005515381 A | 5/2005 |
| JP | 2014513248 A | 5/2014 |
| KR | 200226964 Y1 | 6/2001 |
| KR | 20100086723 A | 8/2010 |
| RU | 2117190 C1 | 8/1998 |
| RU | 2013128237 A | 3/2015 |
| RU | 2575430 C2 | 2/2016 |
| TW | 201525305 A | 7/2015 |
| WO | WO 2011137955 A1 | 11/2011 |

* cited by examiner

ANCHOR HAVING A WAVE-SHAPED SLEEVE

The invention relates to an anchor. Such an anchor has a sleeve, a bolt that passes through the sleeve and at least one expansion element that is positioned in front of the sleeve and that is axially supported on the sleeve, whereby the bolt has an expansion area for the expansion element.

BACKGROUND

German utility model DE 20 2009 013641 U1 shows an undercut anchor for fastening cladding panels made of natural stone to a substrate. This anchor has a wave-shaped, closed expansion ring as an expansion element.

German patent application DE 10 2007 060956 A1 discloses an expansion anchor for joining a stone slab to a concrete slab, whereby the expansion anchor has an expandable element that can be expanded when it is pushed onto an expansion body. The expansion anchor also has a force-transmitting element with which the force used to push the expandable element onto the expansion body can be transmitted, whereby the force-transmitting element is stiffer in the force-transmission direction than perpendicular thereto. For example, the force-transmitting element can be a sleeve with a cylindrical center hole and a wave-shaped outer circumference in the circumferential direction.

German utility model DE 8416683 U1 shows an expansion plug whose compressive zone is a plastic sleeve with external longitudinal ribs as the anti-twist protection means. Other compressible sleeves with external ribs are disclosed in German patent application DE 10 2006 053226 A1.

German patent application DE 10 2004 010727 A1 shows an expansion anchor in which expansion tabs separated by slits are provided as the expansion elements. At the edges of these expansion tabs, which are formed on the slits, the expansion elements run tangentially to the longitudinal axis of the anchor, that is to say, they project there towards the outside.

European patent application EP 2848825 A1 proposes that at least one web which projects into the interior of the sleeve and which forms a local wall thickening be provided on the expansion elements configured as expansion tabs, and it also proposes that a matching groove be provided on the bolt, said groove at least partially accommodating the web prior to the expansion of the expansion tabs. Since the wall is locally thicker at the web, a particularly large maximum radial extension of the expansion elements and thus a very good anchoring can be achieved during the expansion.

German patent specification DE 19538898 C2 discloses an impact anchor having an additional expansion sleeve. This expansion sleeve has a web that is inserted radially through the body of the plug. When the impact anchor is put in place, an impact tool is placed onto the web and the action of the impact tool onto the web pushes the expansion sleeve axially forward. For stabilization purposes, the web situated inside the body of the plug can be configured so as to be wave-shaped.

German patent specification DE 3336168 C2 shows a clamping plug, whereby the outer surface of the clamping area of the clamping plug can be provided with ribbing that can prevent the clamping plug from being pulled too easily out of the masonry since the ribbing gives rise to a higher friction factor. As an alternative, instead of ribbing, it is also possible to provide a wavy shape having wavy structures that encircle the plug like rings.

U.S. Pat. No. 4,753,559 A shows a two-shell expansion sleeve for a rock bolt having a wavy shape with wavy structures that encircle the expansion sleeve like rings.

SUMMARY OF THE INVENTION

It is an object of the present invention to provide an anchor which, while being highly reliable and easy to handle, can be manufactured very cost-effectively and yields excellent load values, preferably also in the case of crosswise loads.

The present invention provides an anchor having a sleeve, a bolt that passes through the sleeve and at least one expansion element that is positioned in front of the sleeve and that is axially supported on the sleeve, whereby the bolt has an expansion area for the expansion element.

An anchor according to the invention is characterized in that the sleeve has a wavy shape with axial wave peaks in which the outer radius of the sleeve as well as the inner radius of the sleeve each have a maximum, and with wave valleys in which the outer radius of the sleeve as well as the inner radius of the sleeve each have a minimum.

A fundamental idea of the invention can be seen in the fact that the sleeve has a wavy shape in which wave peaks and wave valleys alternate along the circumference of the sleeve. The wavy shape here is especially in phase, both on the inside of the sleeve as well as on the outside of the sleeve, that is to say, the inner radius of the sleeve as well as the outer radius of the sleeve are at a maximum, especially locally at a maximum, on a wave peak, while the inner radius of the sleeve as well as the outer radius of the sleeve are at a minimum, especially locally at a minimum, in a wave valley.

Due to this wavy shape, the sleeve according to the invention can cover the same annular space as a sleeve made of solid material, but it does so while requiring considerably less material in comparison to a sleeve made of solid material. In particular, with such a sleeve according to the invention, points of contact can be created in the wave valleys in order to support the bolt on the sleeve and points of contact can be created on the wave peaks in order to support the sleeve on the wall of the drilled hole. In this manner, according to the invention, a particularly cost-effective sleeve can be obtained without incurring major losses in terms of its functionality. Preferably, such a sleeve can be made of sheet metal, for instance, by means of a shaping process, which can reduce the production costs even further.

Moreover, a wave-shaped sleeve according to the invention can improve the load values of the anchor, especially the load values under crosswise loads of the kind that can occur, for example, in the case of earth movements. After all, the wavy shape according to the invention can allow a systematic deformation of the sleeve in the crosswise direction, an aspect which can be advantageous in terms of the absorption of crosswise loads, especially since axial force components can be generated instead of shear forces, as will be explained in detail below in conjunction with the figures.

According to the invention, the wave valleys and the wave peaks run axially, which can especially entail that wave peaks and wave valleys lie one above the other in cross-sectional planes of the sleeve that are axially at a distance from each other. In particular, the sleeve can have a cross section that is constant along the sleeve, at least in certain areas, that is to say, the radial extension of the wave peaks and wave valleys does not change along the longitudinal axis. In particular, the wave valleys and/or wave peaks can run parallel to the longitudinal axis.

Insofar as mention is made here of the axial direction, the radial direction and/or the circumferential direction, this should especially relate to the longitudinal axis of the bolt, the longitudinal axis of the sleeve and/or the longitudinal axis of the anchor, whereby these axes preferably coincide with each other. The outer radius and the inner radius are likewise measured starting from the longitudinal axis.

Preferably, the wavy shape is periodical, which can especially entail that the wave peaks and wave valleys are repeated at regular intervals. This allows for a particularly high degree of symmetry, which can be advantageous in terms of the force transmission.

The sleeve surrounds the bolt, particularly in an annular manner. The expansion area can be provided especially in the region of the front end of the bolt. The sleeve is preferably arranged on the bolt so as to be offset towards the rear relative to the expansion area of the bolt, at least in certain areas. In the region of its rear end, the bolt preferably has a load application area for the application of tensile forces into the bolt. For instance, the load application area can be configured as an external thread. However, a configuration of the load application area as a bayonet mechanism or as a simple head with a widened cross section is likewise conceivable.

On the expansion area of the bolt between the bolt and the expansion element, there is a wedge gear that, under axial tensile forces in the bolt, can force the expansion element radially outwards, thus anchoring the bolt in a drilled hole. Particularly in the expansion area, the bolt can be provided with a slanted surface where the radius of the bolt decreases towards the rear of the bolt, in other words, said surface thus widening towards the front of the bolt. The expansion area is preferably an expansion cone. The anchor can especially be an undercut anchor that is anchored in an undercut drilled hole. In this case, the expansion element engages with the undercut of the drilled hole during the anchoring process. The anchor according to the invention can preferably serve to fasten cladding panels to a substructure.

The expansion element is axially supported on the sleeve. Therefore, the sleeve can form an abutment for the expansion element so as to prevent the expansion element from retracting towards the rear when the expansion area of the bolt acts against the expansion element under axial tensile force in the bolt. The sleeve, in turn, can be supported on its rear, for instance, on an add-on component. The sleeve can also be seen as a spacer sleeve, especially in contrast to an expansion sleeve.

Preferably, the bolt is configured in one piece, especially so as to be monolithic. However, it can also be configured in multiple parts, whereby particularly the load application area and the expansion area can be arranged at different parts of the bolt. The sleeve and/or the bolt preferably consist of a metal material, especially of steel.

In particular, it can be provided for the sleeve to be at least 0.5 times as high as the diameter of its circumference, preferably at least 1 time as high. The effect according to the invention in terms of the material savings is particularly noticeable in the case of tall sleeves.

In order for the wavy shape to function very efficiently, the difference of the inner radius of the sleeve between a wave peak and the adjacent wave valley, at least in certain areas, is preferably at least 0.5 times as thick as the wall of the sleeve in this area, preferably at least 1 time as thick. For the same reason, the difference of the outer radius of the sleeve between a wave peak and the adjacent wave valley, at least in certain areas, is preferably at least 0.5 times as thick as the wall of the sleeve in this area, preferably at least 1 time as thick. In other words, the peak-to-valley distance is at least 0.5 times the thickness of the wall.

It is particularly advantageous for the sleeve to have a constant wall thickness, at least over 75%, preferably over at least 90% of its surface area. This can be advantageous in terms of the production since sheet metal can be used as the starting material, and moreover, this can be advantageous in terms of the force transmission. Deviations from the constant wall thickness can be present, for example, at the site of local hook elements that serve to anchor the sleeve to the wall of the drilled hole. As is customary practice in this field, fluctuations in the constant wall thickness can be up to ±3%.

It is likewise practical for the wavy shape on the sleeve to extend all the way to the rear, that is to say, the wavy shape extends to the rear of the sleeve facing away from the expansion element. This especially ensures that the wavy shape of the anchored anchor extends very close to the opening of the drilled hole, which can be advantageous in terms of the load absorption. It is particularly preferred for the wavy shape to cover the entire sleeve, in other words, for the wave peaks and wave valleys to extend along the entire sleeve, from the front all the way to the rear. Such a sleeve can be manufactured very easily, in addition to which it can ensure very good centering in the drilled hole.

The at least one expansion element could be, for instance, a ring made of wire that surrounds the bolt. Especially preferably, however, the at least one expansion element is an expansion tab. The term expansion tab can especially refer to an element that extends flatly in the circumferential direction as well as in the axial direction. The expansion tab preferably spans one-fourth of the circumference of the bolt at the maximum, that is to say, the angular extension of the expansion tab as measured on the longitudinal axis is less than 90°. This allows a very reliable expansion and a particularly uniform application of force, especially if several such expansion tabs are provided. The expansion tab can have one or more radial cutouts, preferably passage openings, for instance, in order to systematically influence the bending behavior.

It is particularly practical for the expansion tab to be situated axially in front of a wave peak. This can particularly entail that, on the one hand, the expansion tab and the wave peak span a shared angular range on the longitudinal axis, that is to say, the expansion tab and the wave peak overlap at least in certain areas, as seen in the direction of the longitudinal axis and, on the other hand, the expansion tab is situated axially further forward than the wave peak, at least in certain areas. Therefore, the expansion tab constitutes an extension of the wave peak, at least in certain areas, and/or it is flush with the wave peak, at least in certain areas. Since the wave peaks are located relatively far towards the outside radially, according to this embodiment, the expansion tab is also located relatively far towards the outside and therefore its action can be exerted very effectively against the wall of the drilled hole, even in case of a slight bending angle caused by the expansion area. Consequently, a very reliable anchoring can be achieved with little production effort.

In particular, it can be provided for the anchor to have a plurality of expansion elements configured as expansion tabs, whereby an expansion tab is situated in front of each wave peak. This additionally translates into a very uniform force transmission. If several expansion tabs are provided, at least one of these expansion tabs, preferably all of the expansion tabs, can be configured as described above in conjunction with the single expansion tab. The expansion tabs can together form an expansion sleeve, but they do not have to do so.

In another preferred embodiment of the invention, at least one expansion element is configured in one piece with the sleeve. Owing to the combination of the expansion element with the sleeve, it is possible to attain a particularly easy-to-handle anchor. In particular, it can be provided for the at least one expansion element to be configured monolithically with the sleeve, whereby the monolithic configuration can especially entail that the expansion element and the sleeve are contiguous, without any joints. This allows for a simple production and makes it possible to even further increase the reliability of the anchoring of the anchor since, among other things, the expansion element can be positioned very reliably.

It is also particularly advantageous for the sleeve to have an axial slit which divides the sleeve. The slit divides the sleeve, that is to say, the slit runs from the front of the sleeve all the way to the rear. Accordingly, the sleeve wraps around the bolt in the shape of a C. This configuration translates into a very simple production of the sleeve using a strip of sheet metal.

Advantageously, the slit is arranged in a wave valley. This can further simplify the production and render the force application even more uniform, especially when expansion elements are positioned in front of all of the wave peaks.

Another advantageous refinement of the invention consists of providing the bolt with at least one projection that engages into the sleeve, thus forming an anti-twist protection means on a wave peak. Accordingly, the projection engages into a wave peak on the inside of the sleeve and, by means of a positive fit, it secures the sleeve against rotation relative to the bolt around the longitudinal axis. Consequently, the wavy shape can very easily also take over the function of an anti-twist protection means. Preferably, the projection is an axial web. This allows an axially extending positive fit and that thus constitutes a particularly reliable anti-twist protection means. Advantageously, the bolt is provided with several projections arranged at a distance from each other along the circumference, especially axial webs that engage into the sleeve at a given wave peak, thus forming an anti-twist protection means.

In particular, it can be provided for the projection to be arranged so as to be axially offset towards the rear relative to the expansion area of the bolt, at least in certain areas. Consequently, the expansion area can remain free of elevations that, by blocking the axial movement, could potentially have a detrimental effect on the expansion behavior if the sleeve were to be positioned erroneously, that is to say, the reliability can be enhanced even further in a very simple manner by means of this embodiment.

In another preferred embodiment of the invention, the sleeve is tapered towards the front. The tapering can especially be provided on the wave peaks, that is to say, the wave peaks run forward in the direction of the longitudinal axis. A sleeve configured in such a manner can particularly easily compensate for deviations in the diameter of the drilled hole and an excellent seat can be achieved in the drilled hole. Preferably, the sleeve can taper conically towards the front. In particular, this can entail that the wave peaks define the generatrix of a cone.

BRIEF DESCRIPTION OF THE DRAWINGS

The invention will be described in greater detail below on the basis of preferred embodiments which are schematically shown in the accompanying figures, whereby individual features of the embodiments shown below can be fundamentally implemented either individually or in any desired combination within the scope of the invention. The figures schematically show the following:

in FIG. 5 in a cross section at the height of the sleeve, and in FIG. 6 in a longitudinal sectional view; in FIG. 7 in a cross section at the height of the sleeve, and in FIG. 8 in a side view.

DETAILED DESCRIPTION

Figure 1:
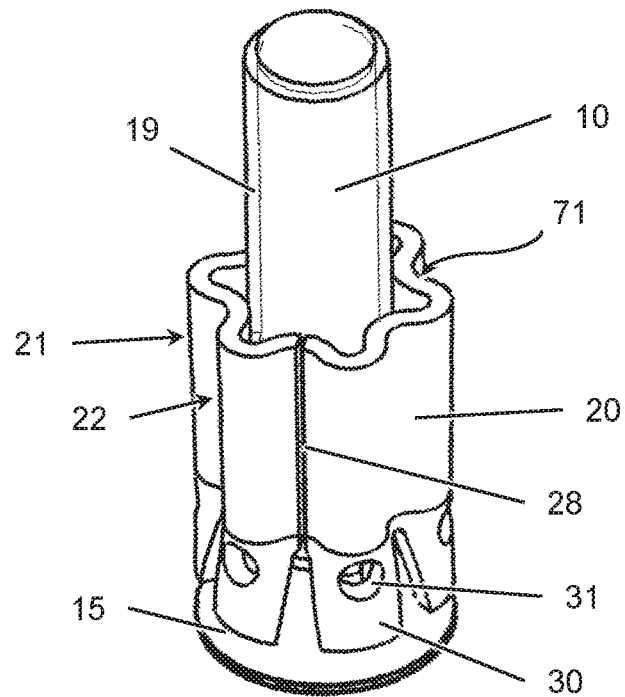
FIG. 1: a perspective view of an anchor according to the invention.

Functionally identical elements are designated in the figures with the same reference numerals.

FIGS. 1 to 6 show an embodiment of an anchor according to the invention. The anchor has an elongated bolt 10 which, in the area of its rear end, has a load application area 19 configured as an external thread and, in the area of its front end, it has an at least approximately conical expansion area 15 where the cross section of the bolt 10 increases towards the front.

The anchor also has a sleeve 20 that encircles the bolt 10 like a ring. Several, for instance, six, expansion elements 30 are arranged on the front of the sleeve 20. These expansion elements 30 are designed as cylindrical shell-sectional expansion tabs and they are configured as one piece monolithically with the sleeve 20. The expansion elements 30 are arranged at least approximately equidistant around the bolt 10. As can especially be seen in FIG. 1, the expansion elements 30 each have a cutout configured as a passage opening 31 at their transitions to the sleeve 20, so that the bending behavior can be adjusted.

Figure 2:
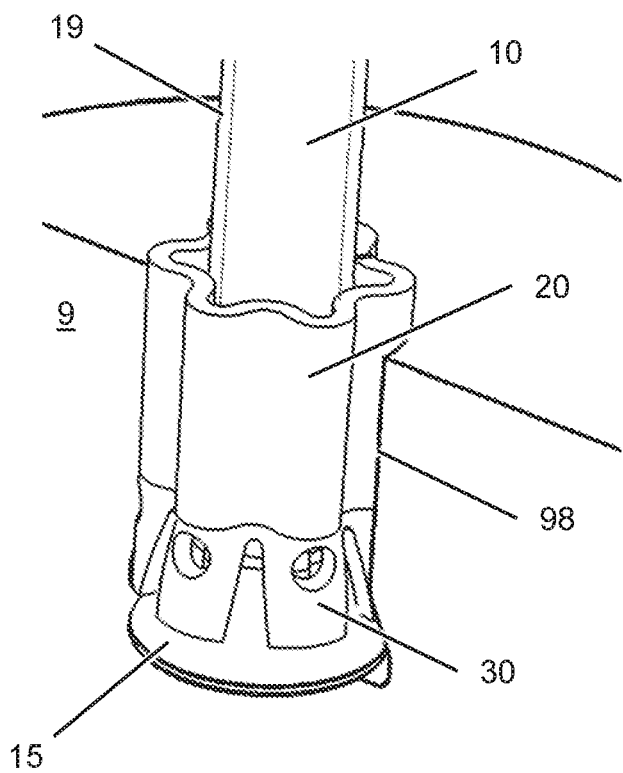
FIG. 2: another perspective view of the anchor shown in FIG. 1, whereby the anchor in the case of FIG. 2 is arranged in a hole drilled in a substrate.

When the anchor shown in FIG. 2 is used properly, the anchor with its front facing forward is inserted into a hole drilled into a substrate 9. If a tensile force then occurs in the bolt 10, the expansion area 15 of the bolt 10 is axially pulled into the expansion elements 30. Since the bolt 10 widens towards the front at the expansion area 15, the tensile force in the bolt 10 is converted in this process into a radial force component that acts on the expansion elements 30, thereby pressing the expansion elements 30 against the wall 98 of the drilled hole and anchoring the anchor in the substrate 9. The sleeve 20 constitutes an axial abutment for the expansion elements 30, thus preventing the expansion elements 30 from receding towards the rear. The sleeve 20, in turn, is held back at the rear 71 of the sleeve 20 by an add-on component 8 that is only shown in FIG. 6.

The sleeve 20 has a wavy shape with a plurality of wave peaks 21 and wave valleys 22 that alternate along the circumference of the sleeve 20. The wave peaks 21 and wave valleys 22 extend axially along the sleeve 20, that is to say, in the direction of the longitudinal axis 99. Here, the wave peaks 21 and wave valleys 22 cover the entire sleeve 20 and especially extend all the way to the rear 71 of the sleeve 20. As can especially be seen in FIG. 3, on a wave peak 21, the inner radius $r_i$ of the sleeve 20—measured starting from the longitudinal axis 99—as well as the outer radius $r_a$ of the sleeve 20—measured starting from the longitudinal axis 99—each have a local maximum. In a peak valley 22, in contrast, the inner radius $r_i$ of the sleeve 20 as well as the outer radius $r_a$ of the sleeve 20 each have a local minimum. The wall thickness d of the sleeve 20 is essentially constant on the wavy shape.

The expansion elements 30 are each located in front of a wave peak 21 and they are axially flush with this wave peak 21. As a result, in particular, the inner radius $r_i$ as well as the outer radius $r_a$ of each expansion element 30 adjoin the appertaining adjacent wave peak 21. This can especially be seen in FIG. 3.

The sleeve 20 has a slit 28 that extends axially all the way through the entire sleeve 20 and that divides the sleeve 20. As a result, the sleeve 20 has a C-shape that surrounds the bolt 10. The slit 28 is arranged in a wave valley 22 and is thus offset relative to the expansion elements 30 in the circumferential direction.

Figure 4:
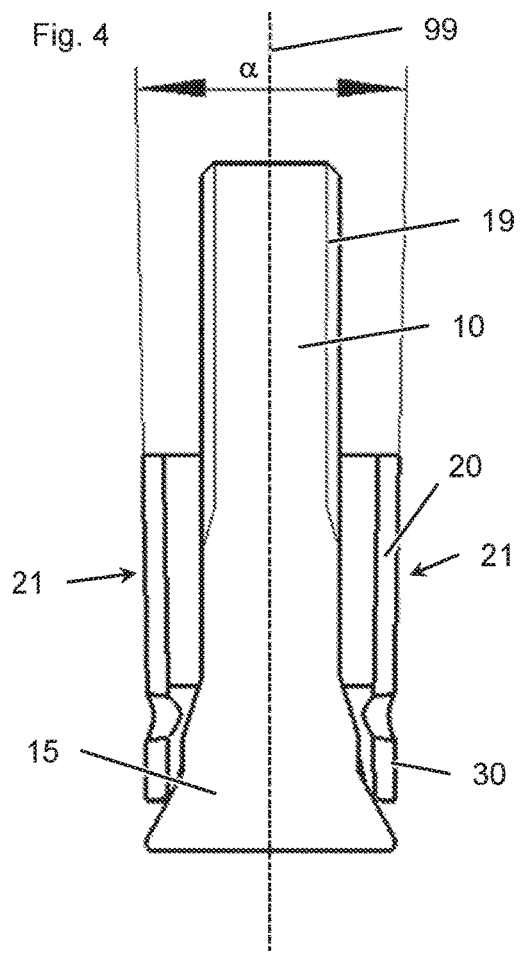
FIG. 4: a longitudinal sectional view of the anchor shown in FIGS. 1 and 2.
Figure 5:
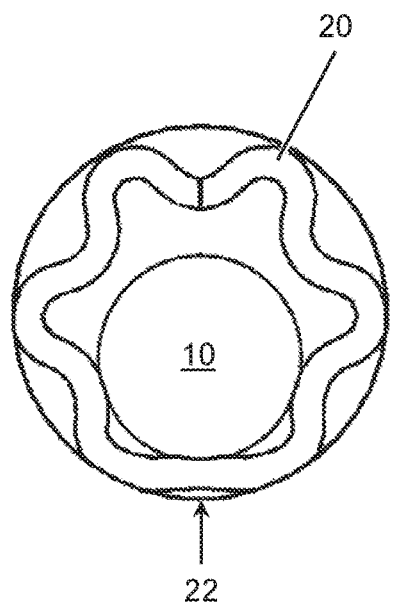
FIGS. 5 and 6: the anchor shown in FIGS. 1 and 2 under a crosswise load.

As can especially be seen in FIG. 4, the sleeve 20 has a shape that tapers slightly towards the front, that is to say, towards the expansion area 15 of the bolt 10. This tapering, which especially can be conical, is particularly present on the wave peaks 21, that is to say, the wave peaks 21 run forward in the direction of the longitudinal axis 99. Owing to the tapered shape of the sleeve 20 and its wavy shape, the sleeve 20 can center itself, especially even in the case of a drilled hole that is not exactly round. The opening angle α of the tapering is preferably smaller than 10°, especially smaller than 5°.

Figure 3:
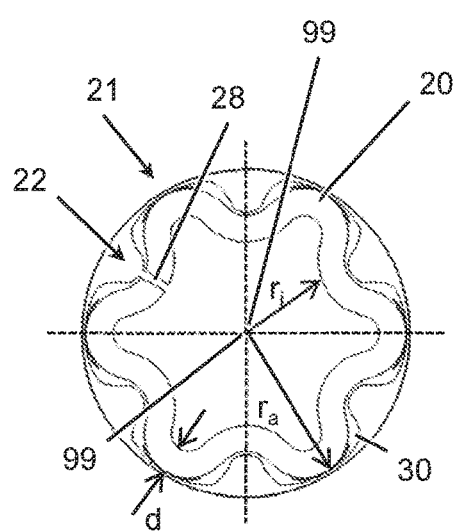
FIG. 3: a top view of the sleeve of the anchor shown in FIGS. 1 and 2.

As can especially be seen in FIG. 3, the peak-to-valley distance, that is to say, the difference of the inner radius $r_i$ of the sleeve 20 and/or of the outer radius $r_a$ of the sleeve 20 between wave peaks 21 and adjacent wave valleys 22 is greater than the wall thickness d. Due to the wavy shape, the sleeve 20 can be supported on the wall 98 of the drilled hole, namely on the wave peaks 21, as well as on the bolts 10, namely, in the wave valleys 22, and this is the case even though the annular gap between the bolt 10 and the wall 98 of the drilled hole is larger than the wall thickness d of the sleeve 20.

In addition, due to the wavy shape, it is possible to attain a special load behavior under a crosswise load, generated, for instance, by earth movements. This can be seen particularly well in FIGS. 5 and 6. These figures show the case in which a crosswise load is applied onto the bolt 10 via an add-on component 8. In this case, the area of the wavy shape located in front of the bolt 10 as seen in direction of the crosswise load (at the bottom in FIG. 5) can be pressed flat by the bolt 10. In other words, in case of a seismic load, a certain deformation path is permissible, something which, in comparison to a stiff, non-yielding sleeve, can translate into an improvement of the load behavior.

Figure 6:
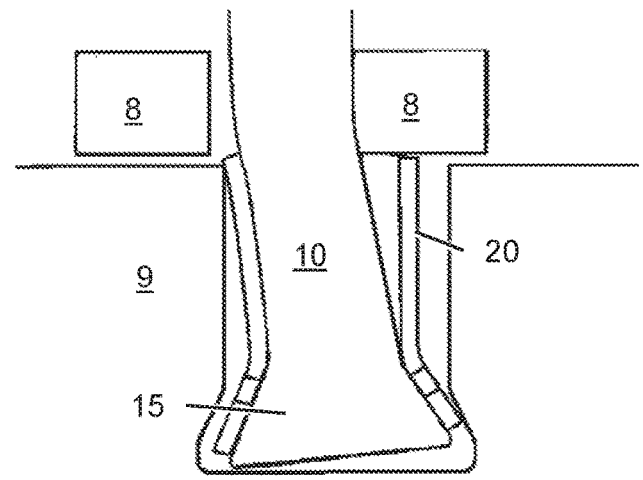

In particular, the deformation of the sleeve 20 as shown in FIG. 6 can result in a slight tilting of the bolt 10 (towards the left in FIG. 6), thus causing the expansion area 15 on the side facing away from the crosswise load (on the right in FIG. 6) to be pulled axially towards the sleeve 20, consequently stressing the anchor in the main direction of the load. Owing to this mechanism, the crosswise load that is actually being exerted perpendicular to the main direction of the load can be transformed into a load component in the main direction of the load.

Figure 7:
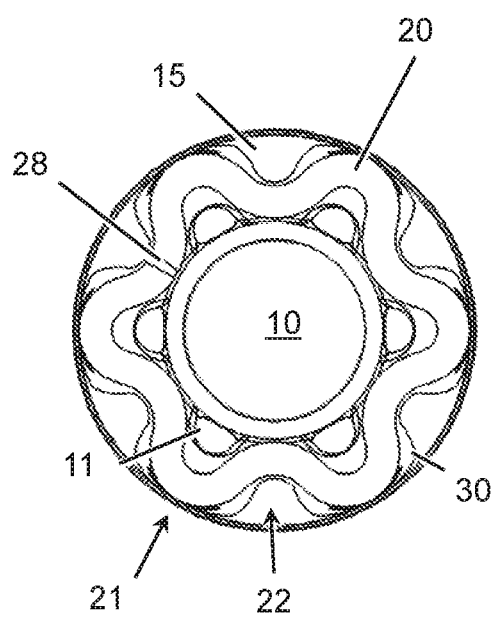
FIGS. 7 and 8: a variation of the anchor shown in FIGS. 1 and 2.
Figure 8:
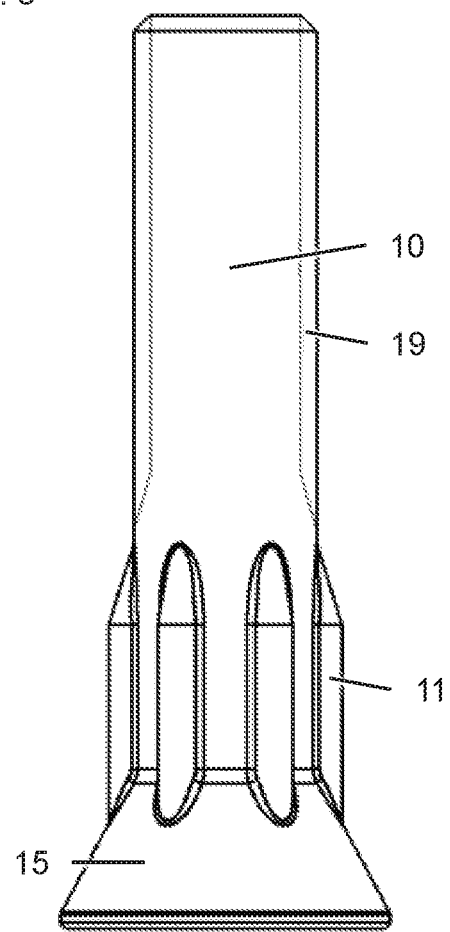

FIGS. 7 and 8 show a modification of the anchor depicted in FIGS. 1 to 6. According to the modification shown in FIGS. 7 and 8, the bolt 10 has projections 11 that project radially outwards and that are configured as webs that run axially and parallel to each other. The projections 11 each engage from the inside into a wave peak 21 and thus couple the sleeve 20 and the bolt 10 non-rotatably to each other, that is to say, they form an anti-twist protection means between the sleeve 20 and the bolt 10. As is especially shown in FIG. 8, the projections 11 here are axially offset towards the rear with respect to the expansion area 15, that is to say, in the direction of the load application area 19, so that they do not hinder the expansion process of the expansion elements 30.

What is claimed is:

1. An anchor comprising:
   a sleeve;
   a bolt passing through the sleeve; and
   at least one expansion element positioned in front of the sleeve and axially supported on the sleeve, the bolt having an expansion area for the expansion element,
   the sleeve having a wavy shape with axial wave peaks in which an outer radius of the sleeve as well as an inner radius of the sleeve each have a maximum, and with axial wave valleys in which the outer radius of the sleeve as well as the inner radius of the sleeve each have a minimum wherein the wavy shape extends all the way to a rearmost point of the sleeve facing away from the expansion element or the wavy shape covers an entirety of the sleeve.

2. The anchor as recited in claim 1 wherein the sleeve has a constant wall thickness over at least 90% of its surface area.

3. The anchor as recited in claim 1 wherein the wavy shape extends all the way to the rearmost point of the sleeve facing away from the expansion element.

4. The anchor as recited in claim 1 wherein the at least one expansion element is an expansion tab situated in front of at least one of the axial wave peaks.

5. The anchor as recited in claim 1 wherein the anchor has a plurality of expansion elements configured as expansion tabs, one expansion tab of the expansion tabs being situated in front of each of the axial wave peaks.

6. The anchor as recited in claim 1 wherein the at least one expansion element is configured as one piece with the sleeve.

7. The anchor as recited in claim 1 wherein the sleeve has an axial slit dividing the sleeve, the slit being arranged in one of the axial wave valleys.

8. The anchor as recited in claim 1 wherein the bolt is provided with at least one projection engaging into the sleeve to form an anti-twist protection on one of the axial wave peaks.

9. The anchor as recited in claim 8 wherein the projection is arranged so as to be axially offset towards a rear relative to the expansion area of the bolt, at least in certain areas.

10. The anchor as recited in claim 1 wherein the sleeve is tapered towards the front.

11. The anchor as recited in claim 1 wherein the wavy shape covers the entirety of the sleeve.

12. The anchor as recited in claim 1 wherein the axial wave peaks and axial wave valleys cover an entirety of a length of the sleeve.

13. An anchor comprising:
    a sleeve;
    a bolt passing through the sleeve; and
    at least one expansion element positioned in front of the sleeve and axially supported on the sleeve, the bolt having an expansion area for the expansion element,
    the sleeve having a wavy shape with axial wave peaks in which an outer radius of the sleeve as well as an inner radius of the sleeve each have a maximum, and with axial wave valleys in which the outer radius of the sleeve as well as the inner radius of the sleeve each have a minimum; wherein the at least one expansion element is an expansion tab situated axially at a same circumferential location in front of at least one of the axial wave peaks.

14. The anchor as recited in claim 13 wherein the sleeve has a constant wall thickness over at least 90% of its surface area.

15. The anchor as recited in claim 13 wherein the axial wave peaks and axial wave valleys extend all the way to a rear of the sleeve facing away from the expansion element.

16. The anchor as recited in claim 13 wherein the axial wave peaks and axial wave valleys cover an entirety of a length of the sleeve.

17. The anchor as recited in claim 13 wherein the anchor has a plurality of expansion elements configured as expansion tabs, one expansion tab of the expansion tabs being situated in front of each of the axial wave peaks.

18. The anchor as recited in claim 13 wherein the sleeve has an axial slit dividing the sleeve, the slit being arranged in one of the axial wave valleys.

19. The anchor as recited in claim 13 wherein the bolt is provided with at least one projection engaging into the sleeve to form an anti-twist protection on one of the axial wave peaks.

20. The anchor as recited in claim 19 wherein the projection is arranged so as to be axially offset towards a rear relative to the expansion area of the bolt, at least in certain areas.

21. The anchor as recited in claim 13 wherein the sleeve is tapered towards the front.

22. An anchor comprising:
a sleeve;
a bolt passing through the sleeve; and
at least one expansion element positioned in front of the sleeve and axially supported on the sleeve, the bolt having an expansion area for the expansion element,
the sleeve having a wavy shape with axial wave peaks in which an outer radius of the sleeve as well as an inner radius of the sleeve each have a maximum, and with axial wave valleys in which the outer radius of the sleeve as well as the inner radius of the sleeve each have a minimum, the bolt having a circular outer surface contacting the axial wave valleys at the inner radius of the sleeve at the minimum of the inner radius of the sleeve.

* * * * *